United States Patent [19]

Tamas

[11] 4,240,825
[45] Dec. 23, 1980

[54] METALLOTHERMAL PROCESS FOR THE SIMULTANEOUS PRODUCTION OF MAGNESIUM AND CEMENT OR CALCIUM AND CEMENT

[75] Inventor: Istvan Tamas, Budapest, Hungary

[73] Assignee: Vasipari Kutato Intezet, Budapest, Hungary

[21] Appl. No.: 65,329

[22] Filed: Aug. 8, 1979

[51] Int. Cl.³ .............................................. C22B 45/00
[52] U.S. Cl. ..................................... 75/67 R; 106/117
[58] Field of Search ........................ 75/67 R; 106/117

[56] References Cited

U.S. PATENT DOCUMENTS

| | | | |
|---|---|---|---|
| 2,372,571 | 3/1945 | Hansgirg | 75/67 R |
| 4,033,758 | 7/1977 | Johnston et al. | 75/67 R |

FOREIGN PATENT DOCUMENTS 166293  6/1954  Australia ................................. 75/67 R

*Primary Examiner*—M. J. Andrews
*Attorney, Agent, or Firm*—Young & Thompson

[57] ABSTRACT

The invention relates to a new process for the simultaneous production of magnesium and cement from calcined dolomite or calcium and cement from calcined lime. According to the invention calcined dolomite or calcined lime is reduced under a pressure lower than 10 torr and at a temperature of 1300° to 1600° C. with a reducing agent containing silicon and aluminum in a weight ratio of 4:1 to 1:1, wherein the total amount of silicon and aluminum comprises 50 to 100% by weight. 100 to 200 parts by weight of the reducing agent are applied to convert 600 to 800 parts by weight of calcined dolomite or 700 to 1000 parts by weight of calcined lime.

In contrast to the known procedures, the new method according to the invention provides cement as by-product instead of a useless slag.

10 Claims, No Drawings

METALLOTHERMAL PROCESS FOR THE SIMULTANEOUS PRODUCTION OF MAGNESIUM AND CEMENT OR CALCIUM AND CEMENT

The invention relates to a metallothermal process for the simultaneous production of magnesium and cement or calcium and cement.

As is known, magnesium and calcium are generally produced by electrolyzing the melt of their salts.

The salts (generally chlorides) are electrolyzed at about 700° to 900° C. A disadvantage of this method is that it requires extremely pure starting materials, completely free of water, which can be prepared only by a sophisticated and lengthy procedure requiring much labour and energy.

Several attempts have been made to elaborate large-scale methods for the production of magnesium from dolomite ($CaCO_3.MgCO_3$) and calcium from limestone ($CaCO_3$), two minerals occurring abundantly in nature. According to these methods dolomite or limestone is first calcined, and the resulting calcined products ($CaO.MgO$ or $CaO$) are subjected to metallothermal reduction. When silicon is applied as reducing agent, calcined dolomite converts into magnesium according to the equation $$2(CaO.MgO) + Si = 2CaO.SiO_2 + 2Mg,$$

whereas calcined lime yields calcium according to the equation $$4CaO + Si = 2CaO.SiO_2 + 2Ca.$$

When aluminium is used as reducing agent in the metallothermal processes, magnesium or calcium is formed according to the equations $$3(CaO.MgO) + 2Al = 3CaO.Al_2O_3 + 3Mg$$

$$6CaO + 2Al = 3CaO.Al_2O_3 + 3Ca$$

Up to now these methods could not compete with electrolytical techniques, since they yield, beside the intended product, extremely large amounts of useless slag. According to theoretical calculations, 3.6 tons of slag with a compostion of $2CaO.SiO_2$ are formed in the silicothermal production of 1 ton of magnesium, whereas in the aluminothermal process the production of 1 ton of magnesium is accompanied by the formation of 3.72 tons of slag with a composition of $3CaO.Al_2O_3$. In the production of calcium 2.14 tons of $2CaO.SiO_2$ or 2.24 tons of $3CaO.Al_2O_3$ are formed together with one ton of the required product.

The invention aims at the elimination of the above disadvantages of the silicothermal or aluminothermal production of magnesium or calcium by providing an easily performable, economical large-scale method for the metallothermal production of these two alkaline earth metals.

Now it has been found that when preparing magnesium from calcined dolomite or calcium from calcined lime, cement is obtained as valuable by-product in addition to the two metals, if the reduction is performed with an appropriate amount of a reducing agent containing silicon and aluminum in a Si:Al weight ratio of 4:1 to 1:1. In the process 100 to 200 parts by weight of the reducing agent are applied to convert 600 to 800 parts by weight of calcined dolomite or 700 to 1000 parts by weight of calcined lime. When magnesium is to be prepared, one can also proceed by adding not more than 200 parts by weight of calcined lime to 600 to 800 parts by weight of calcined dolomite, and reducing this mixture with 100 to 200 parts by weight of the reducing agent.

Accordingly, the invention is based on the recognition that if a reducing agent containing silicon and aluminum in the weight ratios defined above is applied, and the ratio of the reducing agent to the starting substance is maintained within the above limits, the silicothermal or aluminothermal process yields cement as by-product instead of a useless slag. As it appears from the above ratios, the mixtures of the starting substance and the reducing agent contain relatively high amounts of calcium oxide. As mentioned above, specific advantages arise in the production of magnesium when an additional amount of calcium oxide is added to the calcined dolomite prior to starting the metallothermal reduction. These facts are in striking contrast with the prior efforts, where it was attempted to keep the proportion of calcium oxide at the minimum in order to decrease the amount of slag. On the contrary, according to the invention, it is essential to process mixtures with relatively high calcium oxide contents, since this ensures the formation of cement as by-product instead of a slag.

According to a further variant of the invention a reducing agent also containing calcium is applied. This is again in contrast with the former efforts. The significance of the presence of calcium can easily be understood on the basis of the equation $$5(CaO.MgO) + Ca + 2Si = 2(CaO.SiO_2) + 5Mg$$

This equation shows that calcium also participates in the reduction of calcined dolomite as a reducing agent. Of course, in the processing of calcined lime calcium has no reducing effect but simply increases the yield. The reason for the use of calcium-containing reducing agent in the processing of calcined lime is that CaSi alloy is the most easily available of the reducing agents applicable in practice. The calcium content of this reducing agent increases the yield of the intended product.

As mentioned above, substances containing silicon and aluminum in a weight ratio of 4:1 to 1:1 are applied as reducing agents. The total silicon and aluminum content of the reducing agent may vary between 50 to 100%. This means that simple mixtures or alloys of silicon and aluminum containing the two metals in the above weight ratio can be utilized as reducing agents in the process of the invention. However, reducing agents containing other substances in addition to aluminum and silicon can be utilized as well. As mentioned above, reducing agents also containing calcium are preferred. The calcium content of these reducing agents may amount to 30% by weight; they contain generally 1 to 30% by weight of calcium. The reducing agents utilized in practice are generally iron-containing alloys or mixtures of such alloys. The iron content of the reducing agent may amount to 25% by weight; the reducing agent contains generally 0.1 to 25% by weight of iron. As reducing agent appropriate mixtures of silicoaluminum, ferrosilicon, calciumsilicon, silicoaluminumcalcium and ferrosilicoaluminumcalcium alloys can be used, wherein the ratio of silicon to aluminum, the total silicon and aluminum content, and the calcium and iron content meets the above requirements. Of course, single alloys with appropriate compositions can be used as well.

The reduction itself is performed in apparatuses utilized for silicothermal and aluminothermal processes according to known techniques, at a temperature of 1300° to 1600° C. under a pressure of less than 10 torr, until the development of magnesium or calcium vapours ceases.

The mixture of the starting substances is powdered and briquetted. Appropriate briquettes can be formed from the mixtures generally under a pressure of 500 to 2000 kiloponds/cm$^2$. The briquettes, either as such or optionally after hardening and/or preheating, are filled into the cobbing chamber, kept at 1300° to 1600° C., of a furnace filled with an inert protecting gas. The furnace is closed, the internal pressure is decreased to below 10 torr, and heating is continued, whereupon the briquettes warm up to 1300° to 1600° C. and the metallothermal reaction takes place. The magnesium or calcium vapours formed are collected in the condenser of the furnace, where magnesium or calcium precipitates in crystalline form. At the end of the process the temperature of the condenser drops, since no further magnesium or calcium vapour precipitates in the condenser.

Depending on the composition of the mixture of the starting substance and the reducing agent, the dimensions of the furnace, the temperature and other parameters, reduction is completed generally within 4 to 12 hours.

At the end of the reaction the furnace is refilled with an inert protecting gas, and the cement clinker formed is removed from the cobbing chamber, whereas crystalline magnesium or calcium is removed from the condenser. The process can then be restarted. It is preferred to operate the furnace in cyclic manner.

As protecting gas preferably argon is applied.

The cement clinker removed from the cobbing chamber of the furnace contains 20 to 25% by weight of $SiO_2$, 6 to 12% by weight of $Al_2O_3$ and 62 to 69% by weight of CaO, furthermore, optionally up to 2% by weight of MgO and/or up to 6% by weight of iron. As the composition of this product corresponds to that of portland cement, it can be utilized as binding agent in the building industry.

The most important advantage of the new process according to the invention is that it provides an economical method for the large-scale production of magnesium and calcium. Utilizing the process of the invention the disadvantage of the prior silicothermal and aluminothermal processes, i.e. the formation of large amounts of useless slag, also causing environmental protection problems; can be avoided completely, since all of the products formed in the new process can be utilized.

The process of the invention is easy to perform and requires no specific technological operations or specific equipment. The process can be performed in the apparatuses commonly used for silicothermal and aluminothermal operations, provided that a pressure lower than 10 torr and temperatures of 1300° to 1600° C. can be maintained in them.

The invention is elucidated in detail with the aid of the following non-limiting Examples.

EXAMPLE 1

638 parts by weight of calcined dolomite and 71 parts by weight of calcined lime are admixed with 100 parts by weight of a reducing agent containing 70% by weight of silicon and 30% by weight of aluminum, and the mixture is pulverized by grinding. The powder is briquetted, and the briquettes are cobbed at 1500° C. under a pressure of $10^{-2}$ torr. As a main product of this process 155 parts by weight of magnesium separate in the condenser of the furnace. As by-product, 656 parts by weight of cement containing 66% by weight of CaO, 23.5% by weight of $SiO_2$, 9% by weight of $Al_2O_3$ and 1.5% by weight of MgO remain in the cobbing chamber of the furnace.

EXAMPLE 2

699 parts by weight of calcined dolomite are admixed with 125 parts by weight of a reducing agent containing 56% by weight of silicon, 24% by weight of aluminum and 20% by weight of calcium, and the mixture is pulverized by grinding. The powder is briquetted, and the briquettes are cobbed at 1400° C. under a pressure of $10^{-3}$ torr until the evolution of magnesium vapours cease. As a main product 173 parts by weight of magnesium are obtained. The by-product is 660 parts by weight of cement containing 66.5% by weight of CaO, 23% by weight of $SiO_2$, 10% by weight of $Al_2O_3$ and 0.5% by weight of MgO.

EXAMPLE 3

668.5 parts by weight of calcined dolomite and 35.5 parts by weight of calcined lime are admixed with 112.5 parts by weight of a reducing agent containing 62% by weight of silicon, 27% by weight of aluminum and 11% by weight of calcium, and the mixture is ground. The resulting powder is briquetted, and the briquettes are cobbed at 1600° C. under a pressure of 10 torr until the development of magnesium vapour ceases. As a main product 164 parts by weight of magnesium are obtained. As a by-product 665 parts by weight of cement are formed with essentially the same composition as indicated in Example 1.

EXAMPLE 4

638 parts by weight of calcined dolomite and 71 parts by weight of calcined lime are admixed with 123 parts by weight of a reducing agent containing 57% by weight of silicon, 24.4% by weight of aluminum and 18.6% by weight of iron. The mixture is pulverized by grinding, and the powder is briquetted. The briquettes are cobbed at 1300° C. under a pressure of $10^{-4}$ torr until the development of magnesium vapours ceases. 156 parts by weight of magnesium are obtained as a main product. As a by-product, 675 parts by weight of cement containing 68.4% by weight of CaO, 21.0% by weight of $SiO_2$, 7.0% by weight of $Al_2O_3$, 0.5% by weight of MgO and 3.1% by weight of iron are obtained.

EXAMPLE 5

699 parts by weight of calcined dolomite are admixed with 148 parts by weight of a reducing agent containing 47% by weight of silicon, 20% by weight of aluminum, 17% by weight of calcium and 16% by weight of iron. The mixture is pulverized by grinding, and the powder is briquetted. The briquettes are cobbed at 1550° C. under a pressure of $10^{-1}$ torr until the development of magnesium vapours cease. The process yields 171 parts by weight of magnesium as main product and 677 parts by weight of cement, containing 64.0% by weight of CaO, 19.7% by weight of $SiO_2$, 11.3% by weight of Al$_2$O$_3$, 1.8% by weight of MgO and 3.1% by weight of iron, as by-product.

EXAMPLE 6

668.5 parts by weight of calcined dolomite and 35.5 parts by weight of calcined lime are admixed with 135.5 parts by weight of a reducing agent containing 51.7% by weight of silicon, 22.1% by weight of aluminum, 9.2% by weight of calcium and 17% by weight of iron. The mixture is pulverized by grinding, and the powder is briquetted. The briquettes are cobbed at 1450° C. under a pressure of 10$^{-2}$ torr until the development of magnesium vapours ceases. The process yields 166 parts by weight of magnesium as main product and 671 parts by weight of cement, containing 65.0% by weight of CaO, 24.0% by weight of SiO$_2$, 7.7% by weight of Al$_2$O$_3$, 0.2% by weight of MgO and 3.1% by weight of iron as by-product.

EXAMPLE 7

814 parts by weight of calcined lime are admixed with 100 parts by weight of a reducing agent containing 70% by weight of silicon and 30% by weight of aluminum. The mixture is pulverized by grinding, the powder is briquetted, and the briquettes are cobbed at 1500° C. under a pressure of 10$^{-3}$ torr until the development of calcium vapours ceases. The process yields 258 parts by weight of calcium as main product and 656 parts by weight of cement, containing 64.5% by weight of CaO, 23.6% by weight of SiO$_2$, 11.4% by weight of Al$_2$O$_3$ and 0.5% by weight of MgO, as by-product.

EXAMPLE 8

814 parts by weight of calcined lime are admixed with 135 parts by weight of a reducing agent containing 52% by weight of silicon, 22% by weight of aluminum and 26% by weight of calcium. The mixture is ground, the resulting powder is briquetted, and the briquettes are cobbed at 1600° C. under a pressure of 10$^{-1}$ torr until the development of calcium vapours ceases. The process yields 294 parts by weight of calcium as main product and 650 parts by weight of cement, containing 66.7% by weight of CaO, 22.8% by weight of SiO$_2$, 9.9% by weight of Al$_2$O$_3$ and 0.6% by weight of MgO, as by-product.

EXAMPLE 9

814 parts by weight of calcined lime are admixed with 123 parts by weight of a reducing agent containing 57% by weight of silicon, 24% by weight of aluminum and 19% by weight of iron. The mixture is pulverized by grinding, the resulting powder is briquetted, and the briquettes are cobbed at 1450° C. under a pressure of 10$^{-4}$ torr until the development of calcium vapours ceases. The process yields 254 parts by weight of calcium as main product and 680 parts by weight of cement, containing 64.8% by weight of CaO, 22.7% by weight of SiO$_2$, 8.5% by weight of Al$_2$O$_3$, 0.3% by weight of MgO and 3.7% by weight of iron, as by-product.

EXAMPLE 10

814 parts by weight of calcined lime are admixed with 158 parts by weight of a reducing agent containing 44.3% by weight of silicon, 19.0% by weight of aluminum, 22.2% by weight of calcium and 14.5% by weight of iron. The mixture is pulverized by grinding, the resulting powder is briquetted, and the briguettes are cobbed at 1550° C. under a pressure of 10$^{-3}$ torr. The process yields 298 parts by weight of calcium as main product and 675 parts by weight of cement, containing 62.9% by weight of CaO, 23.5% by weight of SiO$_2$, 9.6% by weight of Al$_2$O$_3$, 0.7% by weight of MgO and 3.3% by weight of iron, as by-product.

What we claim is:

1. A process for the simultaneous production of magnesium and cement from calcined dolomite or calcium and cement from calcined lime, comprising reducing calcined dolomite or calcined lime under a pressure lower than 10 torr and at a temperature of 1300° to 1600° C. with a reducing agent containing silicon and aluminum in a Si:Al weight ratio of 4:1 to 1:1, wherein the total amount of silicon and aluminum comprises 50 to 100% by weight, using 100 to 200 parts by weight of said reducing agent for 600 to 800 parts by weight of calcined dolomite or 700 to 1000 parts by weight of calcined lime, and using the reducing agent and dolomite or lime in such proportions and of such composition that the produced cement contains 20 to 25% by weight of SiO$_2$, 6 to 12% by weight of Al$_2$O$_3$, 62 to 69% by weight of CaO, up to 2% by weight of MgO and up to 6% by weight of iron.

2. A process as claimed in claim 1 for the simultaneous production of magnesium and cement, characterized in that 600 to 800 parts by weight of calcined dolomite are admixed with up to 200 parts by weight of calcined lime, and the resulting mixture is reduced with 100 to 200 parts by weight of the reducing agent.

3. A process as claimed in claim 1, characterized in that a reducing agent containing a substantial amount up to 25% by weight of iron is applied.

4. A process as claimed in claim 1, characterized in that a reducing agent containing a substantial amount up to 30% by weight of calcium is applied.

5. A process as claimed in claim 1, characterized in that a mixture or an alloy of silicon and aluminum containing the two metals in a weight ratio of 4:1 to 1:1 is applied as reducing agent.

6. A process as claimed in claim 1, characterized in that an alloy or an alloy mixture containing silicon and aluminum in a total amount of 50 to 100% by weight, up to 30% by weight of calcium and up to 25% by weight of iron is applied as reducing agent.

7. A process as claimed in claim 6, characterized in that silicoaluminum, silicoaluminumcalcium and/or ferrosilicoaluminumcalcium or a mixture thereof, or a mixture of any of the former alloys and ferrosilicon and/or calciumsilicon is applied as reducing agent.

8. A process as claimed in claim 1, characterized in that reduction is performed in a cyclic operation by placing the powdered and briquetted mixture of the starting substance and the reducing agent in the presence of an inert protecting gas into a furnace equipped with a condenser and heated to 1300° to 1600° C., decreasing the pressure in the furnace below 10 torr, maintaining the furnace temperature within the above limits, and, after the cessation of magnesium or calcium vapour development, filling the furnace with an inert protecting gas, removing the cement clinker from the furnace and the crystalline magnesium or calcium from the condenser, and restarting the above process.

9. A process as claimed in claim 8, characterized in that argon is applied as inert protecting gas.

10. A process as claimed in claim 1, for the simultaneous production of calcium and cement from calcined lime, in which the material that is reduced is calcined lime.

* * * * *